UNITED STATES PATENT OFFICE.

IWAN OSTROMISLENSKY, OF PETROGRAD, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCT OBTAINED THEREBY.

1,242,586.      Specification of Letters Patent.      Patented Oct. 9, 1917.

No Drawing. Original application filed July 29, 1916, Serial No. 112,187. Divided and this application filed November 24, 1916. Serial No. 133,135.

*To all whom it may concern:*

Be it known that I, IWAN OSTROMISLENSKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing rubber or similar material, such as gutta-percha, balata, synthetic rubber, and materials commonly classed under the term "rubber," and to the products obtained thereby. It is more particularly directed to a process for the production of hard and soft rubber products in which the use of sulfur or sulfur compounds as vulcanizing ingredients may be eliminated; and to the products resulting therefrom.

The vulcanization of rubber, according to the practice heretofore followed for the production of both hard and soft compounds, is performed by the use of sulfur or a sulfur containing material. The commercial importance of other processes than those employing sulfur is practically negligible. The use of sulfur alone according to present processes is, however, open to objections which it is the object of the present invention to overcome. For example the cost of sulfur although not large is not negligible and its replacement by a cheaper vulcanizing agent, in view of the large quantity of rubber goods undergoing vulcanization, would effect a considerable saving. Furthermore, soft articles vulcanized by sulfur age somewhat rapidly. Further unavoidable excess of sulfur sometimes occurs in such articles to the detriment thereof—for example, the color of the article is affected and the life shortened—to remedy which a supplementary process of airing must be resorted to which lengthens the process of cure. The range of colors obtainable in both hard and soft rubbers vulcanized by sulfur is limited, the majority of organic dyes, under the conditions heretofore pertaining, tending to change color.

The principal object of the present invention accordingly is to provide a simple and efficient process which by obviating the use of sulfur or sulfur compounds partially or entirely as the vulcanizing agent shall do away with various disadvantages noted in the use thereof. Another object is to provide a series of products having a wide range of desirable physical characteristics employing a vulcanizing agent or agents eliminating sulfur or sulfur compounds.

This is a division of my application, Serial No. 112,187, filed July 29, 1916.

Generally speaking my invention consists in treating a mass of rubber with halogen or halogen-acid compounds of natural and synthetic rubbers such as rubber chlorids and hydrochlorids, chlorids and bromids of the synthetic rubbers. These substances may be prepared by the direct action of halogens, halogen acids, etc., on solutions of the given natural rubbers, synthetic rubbers, etc., and the like. In carrying out the process in its preferred form the rubber to be vulcanized is first reduced to a fine sheet and while on the rollers the vulcanizing compound is added thereto. The halogen compound, for example, chlorid or bromid of rubber is first reduced to a fine powder and then combined with the rubber on the rolls. The proportions employed are 10 grams of rubber and 7 grams of 2.3 dimethylerythrene rubber bromid. The material is placed in the vulcanizing press and heated for one and a half hours at 130° C. The product is an ebonite-like mass.

As alternative procedures 10 grams of rubber, 85 grams of natural rubber bromid heated at 130° C. for two hours produced a similar ebonite-like dark material. 7 grams of rubber heated with 10 grams of cauprene bromid at 130° for two hours gave a similar ebonite-like material. 0.3 grams of rubber heated with 3.6 grams of cauprene chlorid at 130° C. for two hours and twenty minutes produced an ebonite-like substance only superficially colored black.

The ebonite-like substances obtained as above possess in general the desired physical characteristics set forth in the objects above. They are similar in color to that of ordinary ebonites, and possess the stability and physical properties thereof. They do not conduct the electric current, they may be easily cut and polished, and are sufficiently hard so that the polished surface retains its luster even in damp air. Furthermore, the material made according to the processes outlined is relatively inexpensive.

It has been found that the hydrochlorids of natural rubber when used as vulcanizing agents produce soft rubber. The preferred procedure for the production of such rubbers is as follows:—1 part of natural rubber is heated with 16½ parts of hydrochlorid of natural rubber at 130° C. for two hours. The resulting product is a soft rubber which is generally applicable where soft rubbers produced by sulfur vulcanization have been used. The product possesses among others the desirable physical characteristics set forth among the objects of the invention.

A similar form of vulcanization to that set forth takes place when unvulcanized rubber is subjected to the action of an ozonid of rubber. This ozonid may be prepared by subjecting layers of rubber from 0.5 to 1 mm. in thickness to the action of a stream of dried air under the influence of rays of a mercury lamp. After an increase in weight of the original rubber from 0.2 to 1% was secured the product was milled on cold rollers and then reheated for 1–15 minutes at 100 to 120° C. If a small quantity of the ozonids are mixed with unvulcanized rubber and subjected to heat in the usual manner in a vulcanizing press vulcanization is satisfactorily accomplished. According to the quantity of the ozonids of rubber added to the natural rubber either soft or hard rubber may be produced.

It will be observed that the process mentioned is applicable not only to natural rubber but may be applied to various synthetic rubbers. For example, tests carried out with dimethylerythrene and normal erythrene produced good results.

As many apparently widely different embodiments of the invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises adding thereto a rubber compound adapted to produce vulcanization and inducing vulcanization to take place under the action thereof.

2. A process for treating rubber or similar material which comprises forming a rubber compound adapted to produce vulcanization, adding said compound to unvulcanized rubber and inducing vulcanization to take place under the action thereof.

3. A process for treating rubber or similar material which comprises forming a halid compound of rubber adapted to produce vulcanization, adding said compound to unvulcanized rubber and inducing vulcanization to take place thereby.

4. A process for treating rubber or similar material which comprises adding thereto a compound of rubber containing chlorin and inducing vulcanization to take place under the action thereof.

5. A process for treating rubber or similar material which comprises adding thereto a chlorin compound of rubber and inducing vulcanization to take place under the action thereof.

6. As a new compound a vulcanized rubber comprising products of the action of a vulcanizing agent consisting of a rubber compound adapted to produce vulcanization.

7. As a new compound a vulcanized rubber comprising products of the action of a vulcanizing agent consisting of a halid compound of rubber.

8. As a new compound a vulcanized rubber comprising products of the action of a vulcanizing agent comprising a compound of rubber containing chlorin.

Signed at Petrograd, Russia this 17 day of November 1916.

IWAN OSTROMISLENSKY.